(12) United States Patent
Schoke et al.

(10) Patent No.: US 7,692,092 B2
(45) Date of Patent: Apr. 6, 2010

(54) FIRE-RETARDING CABLE CONDUIT FOR ELECTRICAL LINES IN REGIONS POTENTIALLY EXPOSED TO FIRE IN AIRCRAFT

(75) Inventors: Berend Schoke, Twistringen (DE); Thomas Engel, Bremerhaven (DE)

(73) Assignee: Airbus Deutschland GmbH, Hamburg (DE)

( * ) Notice: Subject to any disclaimer, the term of this patent is extended or adjusted under 35 U.S.C. 154(b) by 244 days.

(21) Appl. No.: 11/836,434

(22) Filed: Aug. 9, 2007

(65) Prior Publication Data
US 2008/0217043 A1    Sep. 11, 2008

(30) Foreign Application Priority Data
Aug. 9, 2006   (DE) .................. 10 2006 037 274

(51) Int. Cl.
    *H01B 11/06*   (2006.01)
(52) U.S. Cl. .................................................. 174/36
(58) Field of Classification Search ................ 174/36, 174/121 A, 121 SR, 120 R
    See application file for complete search history.

(56) References Cited

U.S. PATENT DOCUMENTS

| 2,739,829 | A | | 3/1956 | Pedlow et al |
| 2,960,561 | A | * | 11/1960 | Plummer ................... 174/36 |
| 3,089,915 | A | * | 5/1963 | Plummer ................... 174/36 |
| 3,254,678 | A | * | 6/1966 | Plummer ................... 138/139 |
| 3,467,761 | A | * | 9/1969 | Plummer ................... 174/36 |
| 3,582,532 | A | * | 6/1971 | Plummer ................... 174/36 |
| 4,018,962 | A | * | 4/1977 | Pedlow ................... 442/138 |
| 4,018,983 | A | * | 4/1977 | Pedlow ................... 174/135 |
| 4,273,821 | A | * | 6/1981 | Pedlow ................... 428/215 |
| 4,513,173 | A | | 4/1985 | Merry |
| 4,584,214 | A | | 4/1986 | Eiermann |
| 4,788,088 | A | * | 11/1988 | Kohl ..................... 428/34.5 |
| 5,378,530 | A | | 1/1995 | Metivaud et al. |
| 6,010,763 | A | * | 1/2000 | Annemaier et al. ......... 428/76 |

FOREIGN PATENT DOCUMENTS

| DE | 29617849 U1 | | 1/1997 |
| DE | 20 205 505 | * | 8/2003 |
| DE | 20205505 U1 | | 10/2003 |
| WO | 2005/078884 A2 | | 8/2005 |

OTHER PUBLICATIONS

NGS—Material Safety Data Sheet, NGS Naturgraphit GmbH, printed on Apr. 3, 1994 revised on Jan. 3, 2005, 3 pages.

(Continued)

*Primary Examiner*—William H Mayo, III
(74) *Attorney, Agent, or Firm*—Christopher Paradies; Fowler Whit Boggs P.A.

(57) ABSTRACT

A fire-retarding cable conduit for electrical lines in regions potentially exposed to fire in aircraft, has a tubular base body including an interior space for accommodating the electrical lines and may include a sheath. The base body comprise a plastic foam material, which in the event of a fire is intumescent the intumescent foam may form a material that is substantially free of plastic when exposed to fire. A continuous longitudinal slit may be provided for inserting the electrical lines into the tubular base body and may use a form that protects the lines during exposure to fire.

12 Claims, 4 Drawing Sheets

OTHER PUBLICATIONS

Material Safety Data Sheet, supplier: Convenience Products, division of Clayton Corp., Issuing Date: Feb. 26, 2007, 8 pages.
Download from http://en.wikipedia.org/wiki/Vermiculite on Aug. 7, 2007, Vermiculite, 3 pages.
Downloaded from http://en.wikipedia.org/wiki/Vermiculite on Aug. 7, 2007, Vermiculite, 3 pages.

* cited by examiner

FIRE-RETARDING CABLE CONDUIT FOR ELECTRICAL LINES IN REGIONS POTENTIALLY EXPOSED TO FIRE IN AIRCRAFT

REFERENCE TO RELATED APPLICATIONS

This application claims the benefit of the filing date of German Patent Application No. 10 2006 037 274.3 filed Aug. 9, 2006, the disclosure of which is hereby incorporated herein by reference.

FIELD OF THE INVENTION

The field relates to a fire-retarding cable conduit for electrical lines in regions potentially exposed to fire in aircraft.

BACKGROUND

In regions potentially exposed to fire in aircraft, looms of cables are provided with a multi-layer protective sheath in order to improve their fire resistance. To create such a protective sheath, alternately layers of glass fabric and silicon bandages are wrapped around the loom of cables in a spiraling manner and are tied together in sections with the use of pieces of glass rope as fire-resistant cable ties.

Up to now the production of such looms of cables has been associated with very considerable manufacturing expenditure and could practically be implemented only manually. Furthermore, any changes in the electrical cabling, for example in the form of adding or removing an electrical cable from a fire-resistant loom of cables, can be implemented only with considerable expenditure because in these cases, it is necessary to first open the protective sheath of a loom of cables and subsequently to wrap the protective sheath onto the modified loom of cables.

SUMMARY

A fire-retarding cable conduit for electrical lines in regions potentially exposed to fire in an aircraft is a longstanding and unresolved need. New electrical lines may be pulled into a cable conduit without any major production expenditure. Electrical lines may be removed, if necessary, later.

A material is used for base body that is intumescent when exposed to high temperatures existing during a fire. The material may comprise a polymer prior to exposure to fire, but the polymer may be converted to an inorganic material during the process of swelling after exposure to the conditions present in a fire. The base body of the conduit may be contained in a sheath, and both the sheath and the base body may have a slit along the length for inserting cables and wires. Maintenance and repair expenditures may be considerably reduced for cabling electrical wires using the conduit compared to former practices. For example, an interior space for accommodating the electrical lines may be coaxially encased by an intumescent body. In the event of a fire, an intumescent plastic foam expands its volume by a multiple, such as up to 30-times the initial volume, and is capable of forming a high-temperature resistant foam layer containing substantially no plastic. An intumescent plastic foam material, may form a foam without any plastic content due to exposure to fire. At least a portion of the foam may be substantially free of plastic in its foamed state and may act as a kind of "spacer" between the electrical lines and the effects of flames. "Intumescent" means a material capable of swelling when exposed to heat. Many intumescent materials are known in the art, which contain little or no appreciable amounts of polymer after being exposed to the heat of a fire sufficient to cause the intumescent material to expand. To this extent, an intumescent body may be able to shield the electrical lines contained within it from the effect of fire, at least temporarily. Thus, a conduit including a tubular intumescent material may be able to maintain the function of the electrical lines for some time. For example, as a result of the effect of fire, an intumescent plastic foam material may be completely carbonized. Thus, only an "inorganic" foam material remains, free of any plastic, i.e., without any significant plastic remaining in the portion of the body completely carbonized. An inorganic foam material consists essentially of non-polymeric materials, defined herein.

One example of a cable conduit maintains unlimited functionality of the electrical lines at temperatures in excess of 900° C. at heat radiation of 95 kW/m² for a period of at least 5 minutes. For example, the temperature does not exceed 200° C. within the interior of the tubular body for 5 minutes, such that the electrical function of the cables contained in the cable conduit is protected at least over this period of time.

Another example provides for a plastic foam material to be intumescent in the event of a fire, such as a polyurethane foam containing expanded graphite. For example, the plastic foam may remain plastic until exposed to fire. Then, in the event of a fire, the plastic foam swells and converts to an inorganic foam material.

Polyurethane foam (PU foam) may be used, to which expanded graphite is added. This foam multiplies its volume in the event of a fire such that the space between the flames and the cables in the cable conduit is maintained at least for some duration. In conjunction with a plastic foam material capable of improving fire resistance the fire-retarding effect of the cable conduit, an expanding foam is capable of providing protection to electric wires for a least a fixed duration, such as 5 minutes. In this arrangement, the polyurethane foam that encloses the expanded graphite may be completely thermally decomposed. As a result of the effect of fire, the intumescent plastic foam material of the cable conduit may be completely "carbonized" forming an inorganic foam free of plastic. For example, a material known as "expandable graphite" is produced by Bayer AG and is suitable as an intumescent material to be embedded in polyurethane or a polyurethane foam.

As an alternative, silicone foam materials or polyimide foams may be used to form the tubular base body with an intumescent inner body, such as vermiculite. If silicone foam materials or polyimide foam materials are used, expanded graphite is not used to achieve the desired fire-retarding effect. In these examples, another intumescent component is added. For example, the material known as vermiculite is a natural, non-toxic mineral that expands with the application of heat and may be used as one layer in a coaxial arrangement of the base body.

In another example, a the sheath may be formed using at least one silicone strip that has been wound in a spiral shape onto a tubular base body. The outside surface of the tubular base body, which comprises the intumescent plastic foam, may be protected against damage by external influences, such as condensation of water, atmospheric moisture or the like. Furthermore, in the event of a fire, the sheath, at least until its complete thermal decomposition, prevents any uncontrolled expansion of the intumescent plastic foam that forms the tubular base body.

For example, a wrapping around the tubular base body may be formed by silicone strips or silicone tapes wrapped in the same direction or in opposite directions. Instead of being formed by means of bandaging, the sheath can, for example, be formed from a polyethylene (PE) sleeve that has been positioned around the base body. Subsequently, in one example, the polyethylene sleeve is heat-shrunk (heat-shrinkable sleeve). Alternatively, a sleeve may be an alternative, a sheath may be formed by applying an adequately temperature-resistant coating. Alternatively, a sheath may be formed integrally during the process of manufacturing the base body.

For example, between the sheath and the base body, a high-temperature-resistant glass fabric or fused silica fabric may be arranged, and the fabric may be capable of withstanding the effects of a temperature in excess of 1100° C. for an extended period of time (more than 5 minutes in one example). The glass fabric or fused silica fabric may be worked into the sheath as an integral component thereof.

A glass fabric or a fused silica fabric may be foamed or impregnated with an intumescent plastic foam material, and in the event of a fire, the combination results in improved foam material stability in a manner similar to that of fiber reinforcement. Providing a sheath with a glass fabric or a fused silica fabric is advantageous. As a result of the effect of flames, an intumescent material of the base body such as a vermiculite has a tendency to separate into its components. Consequently, it is no longer able to provide adequate mechanical stability. Providing a sheath including a glass fabric or a fused silica fabric reinforces the intumescent material providing additional mechanical stability. Vermiculite may be used in the sheath or in the region of the sheath, for example.

A further advantageous embodiment provides for the exterior diameter of the tubular base body to measure up to 20 cm, and for the interior diameter of the interior space of the tubular base body to measure up to 10 cm. These dimensions ensure that the cable conduit, according to one example, provides optimal fire resistance. A wall thickness of the tubular base body of up to 5 cm provides an optimal compromise between the achievable fire resistance of the cable conduit and the weight of the cable conduit, for example, in use as an aircraft conduit through regions of the aircraft requiring fire resistance.

Another example provides for a longitudinal slit defining two plane surfaces of the longitudinal slit. The plane surfaces extend substantially perpendicularly on an interior surface of the tubular base body and the sheath, for example. The slit allows cables to be inserted and removed without pulling the length of the conduit.

A longitudinal slit may be manufactured easily as is known in the art, such as by cutting. In one example, additional measures are taken in order to prevent any undesirable opening tip or spreading of the slit in the event of a fire. For example, gluing together the surfaces of the longitudinal slit, at least in some sections, is used to prevent undesired spreading of the slit.

Another example provides for the slit to comprise two curved surfaces along the length of the conduit. The two curved surfaces contact the inside surface substantially tangentially and extend through the thickness of the sheath and proceed along the length in an arcuate shape. This arcuate curvature along the length reduces any undesirable spreading, for example.

In one example, a cross sectional geometry of the slit may include a geometry that is approximately in the shape of a semi-spiral. This largely prevents any opening up or spreading of the slit in the event of a fire, as a result of the expanding intumescent plastic foam material even without gluing of any the surfaces of the slit together.

In another example, the slit comprises two surfaces forming a zigzag-shaped surface geometry. The surfaces of the slit may be brought together, at least in some regions, having positive fit, such that the surfaces are interlocked, reducing undesirable spreading. The slit holds together in the event of a fire, without requiring gluing over the entire area. In one example, at least some sections are glued, also, between opposite surfaces of the zig-zag slit.

In another example, two surfaces of a slit are held together using a releasable fastener device and/or are glued to each other at least in some regions. The slit is more reliably held together, even in the case of expanding or foaming of the intumescent material, in the event of a fire. The fastener may be released predictably during a fire. In contrast, a glued surface connection, without a fastener, may open or close unpredictably, at any time.

In another example, a fastener device comprises a plurality of U-shaped retaining clamps. The clamps may be evenly spaced apart from each other and may be arranged along opposite longitudinal edges of the longitudinal slit. The U-shaped retaining clamps may be inserted into the tubular base body in the region of the two edges and may be removable, allowing insertion and removal of electrical lines, for example.

A particularly reliable connection of the longitudinal slit may be provided, such that opening and reclosing of the slit is permitted during installation or repair of cables or wires. For example, at least one limb of the U-shaped retaining clamps may comprise a small barb in order to safely anchor the clamp in the plastic foam or intumescent material of the tubular base body. A U-shaped retaining clamp may be attached in a belt-like configuration on a tape, or the like, such that the installation of a plurality of the clamps is faster than individually placing each of the clamps.

BRIEF DESCRIPTION OF THE DRAWINGS

The examples described and drawings rendered are illustrative and are not to be read as limiting the scope of the invention as it is defined by the appended claims

Similar design elements in the drawings use the same reference characters.

DETAILED DESCRIPTION the examples described and drawings rendered are illustrative and are not to be read as limiting the scope of the invention as it is defined by the appended claims.

Figure 1:
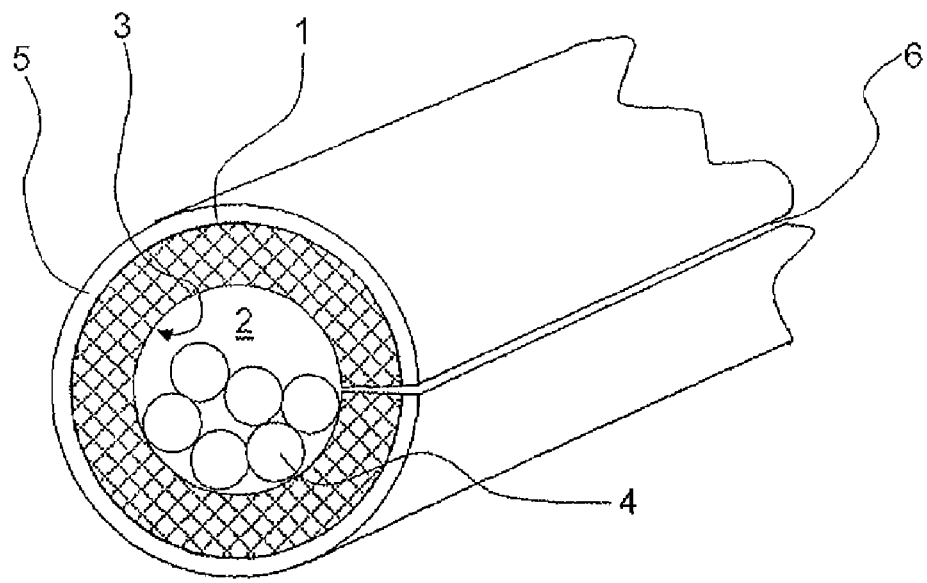
FIG. 1 shows a perspective view of the line conduit with a continuous longitudinal slit.

FIG. 1 shows a perspective view of the line conduit with a continuous longitudinal slit. A tubular base body 1 comprises an intumescent material.

The base body 1 may be made formed using a polyurethane foam (PU foam) to which expanded graphite, such as expanded graphite produced by Bayer AG, is added during the forming process of the PU foam. Alternatively, when silicone foams or polyimide foams are used, an intumescent component such as vermiculite may be added, for example. Many intumescent materials are known in the art. The requirements for the intumescent materials used are that it may be formed into a base body having a tubular shape and after expanding upon exposure to fire an expanded inorganic foam material is present to shield the electrical lines and cables for a period of time.

In the event of a fire, an intumescent plastic foam material may be completely carbonized (thermally decomposed) as a result of the effect of flames such that the remaining foam material of the base body 1 no longer includes any substantial portion of plastic, and in this sense is "free of plastic". During this process, the base body may be transformed into an "inorganic" high-temperature-resistant foam material. Such a material may be substantially free of plastic with the end volume of the base body having multiplied considerably when compared to its initial volume. For example, using the examples provided herein, the end volume may increase up to a factor of 30 when compared to the initial volume of the base body. In the expanded state, the initially present plastic foam material, which in the event of a fire is intumescent, may be converted to an "inorganic" foam material that is free of plastic or substantially free of plastic such that no measurable addition is made by any further combination of any polymer to the heat of the fire. The inorganic foam material acts as a "spacer" in relation to the effect of flames resulting in a fire-retarding effect within the cable conduit. The "spacer" insulates, at least temporarily, the interior of the conduit from the effects of fire exterior to the conduit.

The tubular base body 1 may have a hollow, cylindrical geometry. The interior space 2 is capable of shielding cables, such as electrical and/or optical cables. Within the interior surface 3 of the interior space 2 of the hollow, cylindrical base body 1, a plurality of electrical lines 4 are schematically represented by circles representing lines in a loose state. For the sake of clarity, only one electrical line has a reference character in the drawing. For example, the interior space 2 comprises a self-adhesive coating such that movement of the electrical lines 4 is limited. A plurality of retaining elements, such as, in the form of foamed-on retaining clips, retaining arms or the like are provided, into which the electrical lines can be pressed for fixing their position. The retaining clips may be formed using the intumescent plastic foam or using some other plastic material, for example.

In another example, coating the interior surface 3 with additional functional layers provides some electromagnetic shielding to increase the electrical noise immunity and/or a slide-coating of the interior surface 3 for largely wear-free pulling-in of the electrical lines or cables. A slide coating may improve abrasion protection and enhanced failsafe operation of the electrical systems, of an aircraft, for example.

Among other things, the conduit may be capable of protecting against humidity, atmospheric moisture and mechanical impairment, the base body 1 may be enclosed by a sheath 5. Furthermore, in the event of a fire, the sheath 5 may prevent, at least initially, any uncontrolled outflow or swelling of the intumescent foam material. However, after some time of being exposed to the effect of fire, or swelling of the foam material, the sheath may allow the foam material to expand. For example, the sheath 5 burns up, at least in part, depending on the material from which it is constructed, such that the intumescent foam is released after an initial time and expands by foaming, without further hindrance. The sheath 5 may be formed by bandaging the base body 1 with silicone strips or silicone tapes. The sheath 5 may comprise other plastic materials, for example polytetrafluoroethylene (PTFE), for example. The sheath 5 may be made with a polyethylene (PE) sleeve (heat-shrinkable sleeve) that has been shrunk-on or may be fixed with adhesive on the base body 1.

Between a portion of a sheath 5 and a base body 1, at least in some regions in one example, a high-temperature-resistant glass fabric or fused silica fabric may be arranged. A glass fabric may be integrated directly in the sheath 5, for example. For example, a fabric able to withstand temperatures in excess of 900° C. for an extended period of time, i.e., more than 5 minutes, may be used. A glass fabric or the fused silica fabric in the sheath may be a fiber reinforcement. A fabric is advantageous, in particular when an intumescent plastic foam material of a base body 1 tends to separate when exposed to fire. The foam material may no longer have sufficient mechanical stability on its own. This is the case, for example, if the base body 1 is made from a plastic foam material to which, in order to achieve the intumescent effect, vermiculite is added. An intumescent plastic foam material, which in the event of a fire expands or foams to form a foam material without plastic content, may penetrate a glass fabric or a fused silica fabric. In the event of a fire, penetration of a fabric by the foam may result in improved foam material stability (similar to fiber reinforcement in the case of composite components). Consequently, under the effect of fire, a conduit comprising a glass fabric or a fused silica fabric is not thermally decomposed, because only the plastic foam material or sheath 5 is combusted. As an intumescent component, vermiculite is preferably added to silicone foams or polyimide foams in order to form an intumescent plastic foam material of the base body 1 of the conduit.

In one example, a longitudinal slit 6 extends along the entire length of a tubular base body 1, as well as through the sheath 5. The slit may extend through the thickness of the base body 1, and lines may be placed into, or when necessary removed from, the body 1 at any time, without requiring cable pulling.

Figure 2:
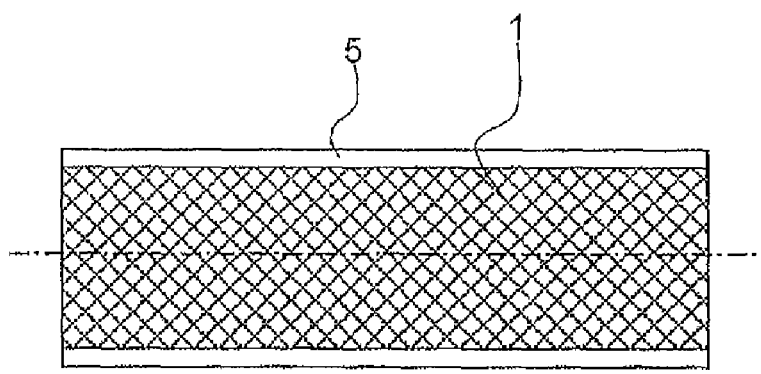
FIG. 2 depicts a longitudinal section of the line conduit in the event of a fire.

FIG. 2 shows a longitudinal section of the line conduit. In the event of a fire, the volume of the intumescent plastic foam swells. A foam may first fill the entire interior space of the sheath 5. The foam may contain little or no plastic as it expands to fill the void. After the sheath 5 of the base body 1 has burned up or thermally decomposed or otherwise separated, further expansion of the intumescent foam material continues unrestrained by the sheath 5, until the intumescent foam reaches its final volume. If the sheath 5 comprises a glass fabric or a fused silica fabric, such fabric may remain even under the effect of fire providing a type of reinforcing support fabric to improve the strength of the foam material. If the intumescent plastic foam material foams through an open mesh of the support fabric, or otherwise penetrates the fabric, it then expands unimpeded. In one example, the fabric has a mesh sufficiently open to allow substantially unimpeded expansion through the mesh. The final volume of the foam material in its final state may be free of plastic and the portion free of plastic may be larger by a factor of 30 than the initial volume of the base body 1. Due to this significant multiplication in volume, in conjunction with fire-retarding treatment or additives, a good fire-retarding effect of the line conduit is provided. Foe example, the production of the base body 1 may add to the plastic foam material, a fire retardant intumescent component, such as expanded graphite or vermiculite or the like.

Figure 3:
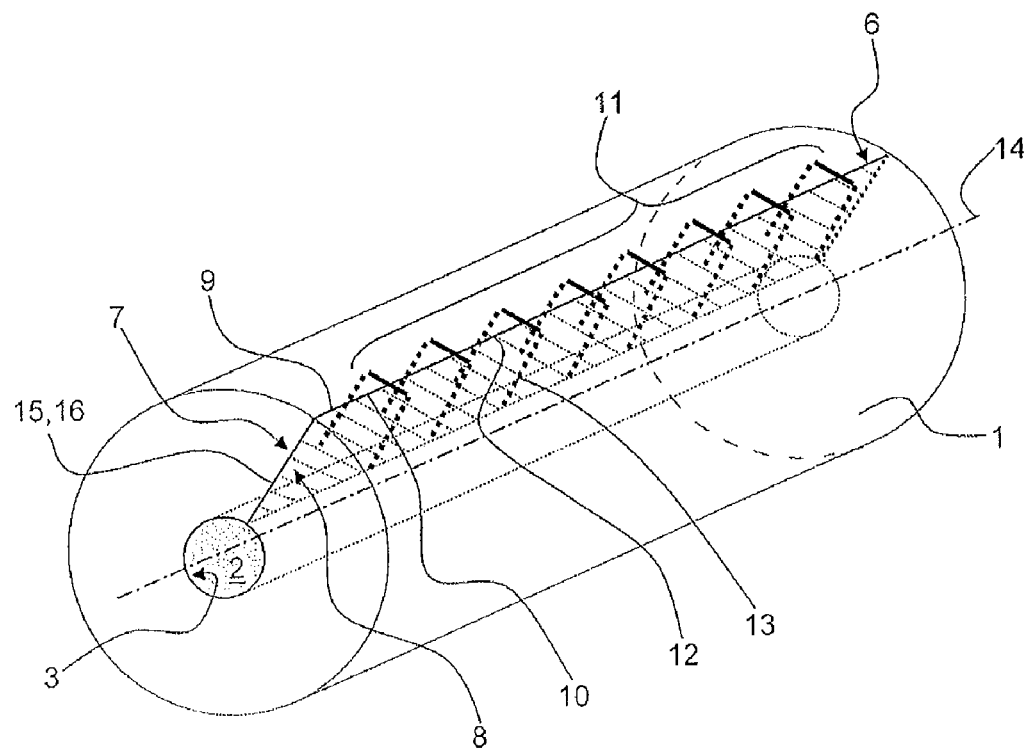
FIG. 3 shows a perspective view of the line conduit in a first embodiment variant comprising a longitudinal slit with plane surfaces of the longitudinal slit, which longitudinal slit is kept together by means of staples.

FIG. 3 is a perspective view of a conduit comprising a longitudinal slit showing plane surfaces of the longitudinal slit. In this example, the longitudinal slit is bound together using a plurality of staples. The longitudinal slit 6 is formed by two surfaces 7, 8 of the longitudinal slit. The surfaces 7, 8 oppose each other. The surfaces 7, 8 of the longitudinal slit form approximately flat or plane surfaces that extend so as to be approximately perpendicular in relation to the interior surface 3 of the interior space 2 of the tubular base body 1 and extend through the base body 1 as well as through the sheath (not shown in FIG. 3). The two longitudinal edges 9, 10 of the longitudinal slit 6 are held together by a multitude of substantially U-shaped staples 11. The staples 11 are evenly spaced apart from each other along the longitudinal edges 9, 10, above the longitudinal slit 6, thus bridging this longitudinal slit 6. The two limbs 12, 13 of one of the staples 11, of which for the sake of clarity only two have reference characters in the drawing, can be inserted into the tubular base body 1 through the sheath. In order to ensure a safe grip of the staples 11 in the base body 1, at least one limb of each staple 11 can comprise a barb (not shown). The staples 11 can repeatedly be inserted into the tubular base body 1 and removed from it without causing any damage. Consequently it is possible in an easy way to subsequently place electrical lines into the interior space 2 of the line conduit, and if necessary to remove lines. In order to facilitate the application of the staples 1, they can be attached to an endless carrier belt so as to be individually removable. In this example of the conduit, the surfaces 7, 8 of the longitudinal slit intersect an imaginary plane that extends so as to be perpendicular to the longitudinal axis 14 of the cable conduit, along the section lines 15, 16. In this arrangement the section lines 15, 16 have the geometric shape of a straight line. The staples 11 are used to prevent opening up or spreading of the longitudinal slit 6.

An intumescent plastic foam, preferably, first expands to fill the void within the conduit. The use of staples 11 helps to prevent uncontrolled outflow of expanding plastic foam material prior to first filling all or a substantial portion of the void. In the event of a fire, any contact of the electrical lines with hot combustion gases and/or any direct flame contact is avoided. In addition to the staples 11, in order to improve the sealing effect, the surfaces 7, 8 of the longitudinal slit, at least in some regions, may be glued together.

Figure 4:
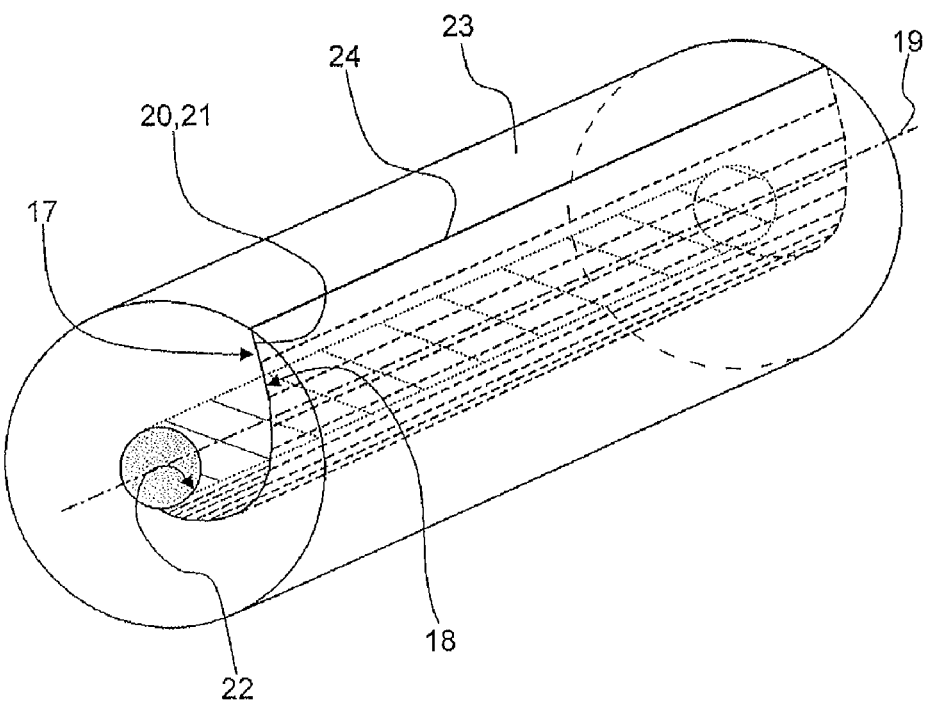
FIG. 4 illustrates a perspective view of the line conduit in a second embodiment variant with curved surfaces of the longitudinal slit.

In contrast to the example of FIG. 3, the example of FIG. 4 shows two surfaces 17, 18 of the longitudinal slit having a spiral shape. In this arrangement, the surfaces 17, 18 of the longitudinal slit, with an imaginary plane (for example in the form of the end face of the tubular base body 23), which imaginary plane extends so as to be perpendicular in relation to the longitudinal axis 19, form the section lines 20, 21, which approximately correspond to a curved spiral section. The section lines 20, 21 for example, may be in the shape of an Archimedean spiral, a hyperbolic spiral, a logarithmic spiral or of an involute of a circle. In various alternative examples, the length of the section lines 20, 21 are extended compared to the example shown in FIG. 3, and an "overlap" of the sheath may prevent any gap from forming. The surfaces 17, 18 of the longitudinal slit may continue approximately tangentially on an interior surface 22 of the tubular base body 23 and may extend through the base body 23 of the conduit not shown in FIG. 4. In one example, due to an "overlap" provided by a special geometric shape of the surfaces 17, 18 of the spiral slit, no staples or other retaining device or method is used. The sealing effect of the longitudinal slit 24 may be enhanced by gluing, along all or a portion of the spiral slit. For example, point-like gluing may be used. Optionally, a slit 24 may be stapled together using a clamp arrangement such as shown in the illustration in FIG. 3. Alternatively, the surfaces 17, 18 of the longitudinal slit may be kept together using a hook-and-loop-type fastening mechanism of overlapping surfaces, in another example.

Figure 5:
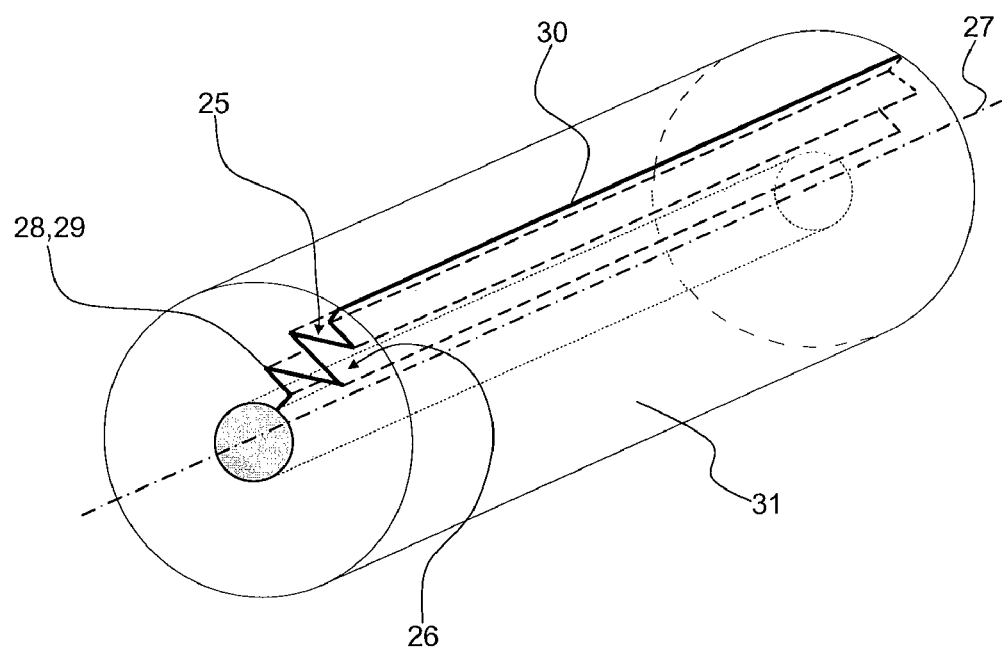
FIG. 5 shows a perspective view of the line conduit in a third embodiment variant comprising surfaces of a longitudinal slit, which surfaces comprise a zigzag-shaped surface geometry.

FIG. 5 shows another example of the fire-retarding cable conduit. In contrast to the examples of FIGS. 3 and 4, the surfaces 25, 26 of the slit in FIG. 5 have a zigzag shape. The surface geometry is folded. In other words the surfaces 25, 26 of the longitudinal slit form zigzag-shaped section lines 28, 29 with an imaginary plane that extends so as to be perpendicular to the longitudinal axis 27. Due to this geometry of the surfaces 25, 26 of the slit, the surfaces 25, 26 are brought together in some regions such that there is a positive fit. A slit 30 in the base body 31 and in a sheath (not shown in FIG. 5) may be closed. In this arrangement, the zigzag-shaped folded surface geometry of the surfaces 25, 26 of the longitudinal slit, in itself, makes it possible for the slit 30 to hold together relatively firmly. Moreover, the slit 30 may be quickly and repeatedly opened and closed with little wear. The surfaces 25, 26 of the longitudinal slit may be glued together, continuously or only in some regions, such as by point gluing.

Figure 6:
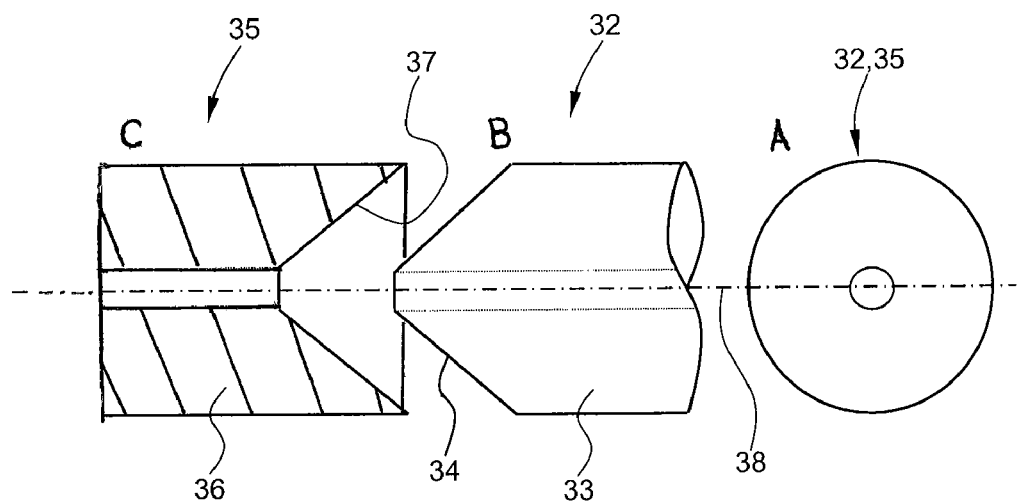
FIG. 6 shows a starting section and an end section of the cable conduit in a first embodiment variant.

FIGS. 6A-6C show a starting section and an end section of a cable conduit in one example of the cable conduit that makes it possible to adjoin two separate sections as desired. In FIG. 6B, a starting section 32 of a first tubular base body 33 of a cable conduit comprises a projection 34 shaped in the manner of a truncated cone. In FIG. 6C, an end section 35 of a second tubular base body 36 of a cable conduit comprises an indentation 37 that is complementary to the projection 34 shaped in the manner of a truncated cone. FIG. 6A shows a top view of the starting section 32 or the end section 35, while FIGS. 6B-6C show a lateral view of the starting section 32 and the end section 35 of the cable conduits to be connected. For adjoining, as far as possible without any seams, the projection 34 can be placed in the indentation 37, having positive fit at least in some regions. In this way any outflow of the intumescent plastic foam material from the base bodies 33, 36 in the event of a fire is largely prevented. Furthermore, in the event of a fire, this prevents flames and/or hot combustion gases to establish direct contact with the electrical lines contained in the cable conduits. As a result of the projection 34 shaped in the manner of a truncated cone, which is arranged on one end of a cable conduit, and the indentation 37 that is arranged on the other end and that is complementary (funnel-shaped) in relation to the projection, any number of cable conduits can be adjoined in a line so as to form longer cable conduits. The longitudinal axis 38 symbolises the horizontal arrangement of the base bodies 33, 36, in relation to each other, of the cable conduits. In order to make it difficult to pull the line conduits apart in axial direction, the starting section and the end section can be glued into place, at least in some sections.

FIGS. 7A-7C show a starting section and an end section of the cable conduit in another example for adjoining of sections of the cable conduit. In FIG. 7B, a starting section 39 of a first base body 40 comprises a projecting piece 41 or plug. In FIG. 7C, an end section 42 of a second base body 43 comprises a recessed piece 44 or groove, which is shaped so as to be complementary to the projecting piece 41. The projecting piece 41 can be placed having positive fit, at least in some regions, into the recessed piece 44, such that end faces 45, 46 of the first and of the second base bodies 40, 43 abut against each other. In FIG. 7A a top view of the end faces 45, 46 are illustrated for both FIGS. 7B and 7C, while the longitudinal axis 47 illustrates a horizontal alignment of the starting section 39 in relation to the end section 42 of the base body 40, 43. The interior spaces 48, 49, (shaded by diagonal lines and shown in dotted, hidden lines in FIGS. 7B-7C) are also hollow-cylindrical in shape and serve to accommodate the electrical lines (not shown in the diagram), and extend centrally in the base bodies 40, 43. The width 50 of a projecting piece 41 approximately corresponds to the exterior diameter 51 of the base bodies 40, 43 so as to achieve an outwardly flush finish of the projecting piece 41. When viewed from above, the projecting piece 41 has an approximately rectangular geometry, as represented by diagonal lines in FIG. 7A, with two longer plane surfaces that extend substantially parallel in relation to each other. Two lateral surfaces, whose surface geometry approximately follows the (circular) exterior contour of the tubular base bodies 40, 43, extend across the aforesaid two plane surfaces, defining the perimeters of both the projecting piece 41 and the complementary recessed piece 44 of the respective sections 39, 42, as shown in FIGS. 7B and 7C.

The hollow-cylindrical interior spaces 48, 49 extend both through the projecting piece 41 and through the recessed piece 44, so as to make it possible to lead electrical lines through. For this purpose, the height 52 of the projecting piece is slightly larger than the interior diameter 53 of the hollow-cylindrical interior spaces 48, 49. A width of a recessed piece 54 approximately corresponds to the exterior diameter 51 of the base bodies 40, 43 or of the width 50 of the recessed piece.

Figure 7:
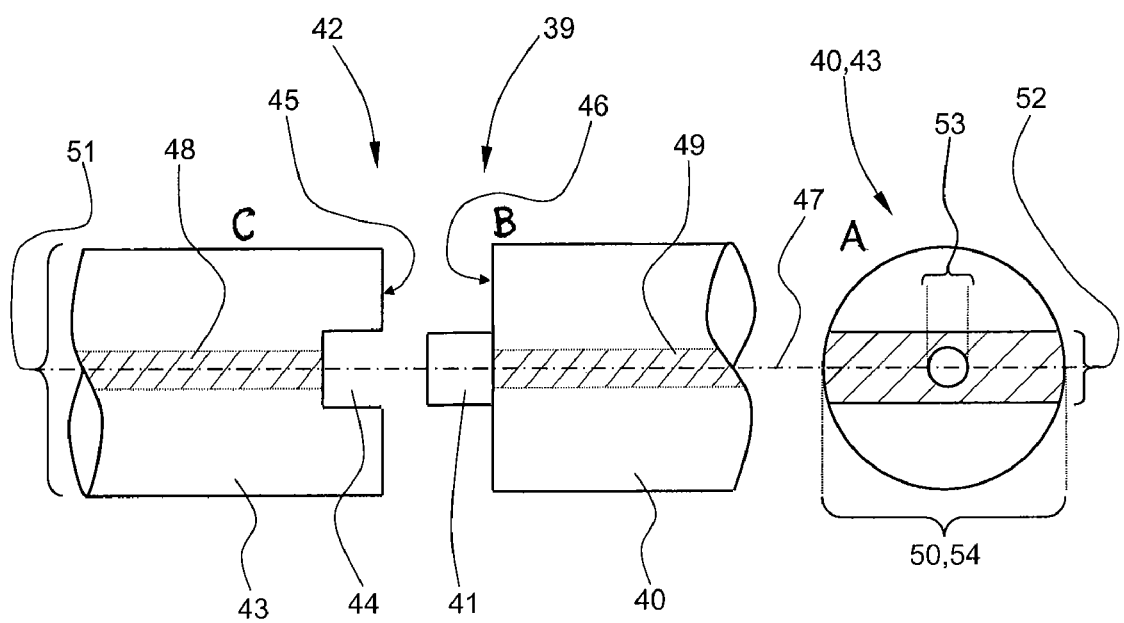
FIG. 7 shows a starting section and an end section of the cable conduit in a second embodiment variant.

The example in FIG. 7, of the starting section 39 and of the end section 42 of the cable conduits makes it possible to adjoin in a line, at will and essentially without forming any gaps, a plurality of cable conduits, such that any outflow of the intumescent plastic foam material from the base bodies is entirely prevented, substantially prevented or substantially reduced compared to less effective methods.

Interior spaces 48, 49, may be designed to fix the position of the electrical lines that are in place. For example, the interior spaces 48, 49 may be self-adhesive, at least in some regions. As an alternative or in addition to this, a plurality of retaining devices, retaining clips or the like, preferably evenly spaced apart from each other, in the region of the interior spaces 48, 49, may be formed in the base bodies 40, 43 of the line conduit and/or can be formed these base bodies 40, 43 such retainers may be formed otherwise.

Furthermore, as an alternative or in addition, the interior spaces can, at least in some sections, comprise further functional coatings, for example electrical shielding and/or slide-coatings, so as to improve the electrical noise immunity and to facilitate pulling the electrical lines or cables in. The retaining devices can comprise the intumescent plastic foam material itself or they can comprise other plastic materials, if required with fiber reinforcement to provide additional strength.

It should also be noted that "comprising" does not rule out any other elements or steps, and that "a" or "an" does not rule a multitude. It should furthermore be noted that characteristics or steps that were described with reference to one of the above embodiments can also be used in combination with other characteristics or steps of other above-described embodiments. The reference symbols in the claims should not be interpreted in a restrictive sense.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

1 Tubular base body
2 Interior space
3 Interior surface
4 Electrical line
5 Sheath
6 Longitudinal slit
7 Surface of the longitudinal slit
8 Surface of the longitudinal slit
9 Longitudinal edge
10 Longitudinal edge
11 Staple
12 Limb
13 Limb
14 Longitudinal axis
15 Section line
16 Section line
17 Surface of the longitudinal slit
18 Surface of the longitudinal slit
19 Longitudinal axis
20 Section line
21 Section line
22 Interior surface
23 Tubular base body
24 Longitudinal slit
25 Surface of the longitudinal slit
26 Surface of the longitudinal slit
27 Longitudinal axis
28 Section line
29 Section line
30 Longitudinal slit
31 Tubular base body
32 Starting section
33 Tubular base body (first)
34 Projection
35 End section
36 Tubular base body (second)
37 Indentation
38 Longitudinal axis
39 Starting section
40 Tubular base body (first)
41 Projecting piece
42 End section
43 Tubular base body (second)
44 Recessed piece
45 End face
46 End face
47 Longitudinal axis
48 Interior space
49 Interior space
50 Width of the projecting piece
51 Exterior diameter (base body)
52 Height of the projecting piece
53 Interior diameter (interior spaces)
54 Width of the recessed piece

The invention claimed is:

1. A fire-retarding cable conduit for electrical lines in regions potentially exposed to fire comprising:
   a tubular base body having a first slit, an interior volume and an exterior surface, and being comprised of an intumescent material, such that the intumescent material is expandable when exposed to the effects of a fire, and the intumescent material is substantially converted to an expanded, inorganic foam after exposure to the effects of a fire causes the intumescent material to fully expand; and a sheath comprised of a glass fabric or a fused silica fabric and having a second slit, the sheath being disposed about the exterior surface of the body;

wherein the first slit and the second slit are arranged such that the electrical lines are insertable into the interior volume through the first slit and the second slit, such that the intumescent material foams through an open mesh of the glass fabric or the fused silica fabric, when the conduit is exposed to fire.

2. The fire-retarding cable conduit of claim 1, wherein the intumescent material of the body comprises a polyurethane foam and an expanded graphite.

3. The fire-retarding cable conduit of claim 1, wherein the sheath is comprised of at least one silicone strip wound in a spiral winding onto the exterior surface of the body.

4. The fire-retarding cable conduit of claim 1, wherein a radial diameter of the exterior surface of the body is no greater than 20 cm, and a radial diameter of the interior volume of the body is no greater than 10 cm.

5. The fire-retarding cable conduit of claim 1, wherein the first slit includes two plane surfaces and the two plane surfaces extend perpendicularly to the exterior surface of the body.

6. The fire-retarding cable conduit of claim 5, further comprising a fastener, an adhesive or both thereof such that the surfaces of the first slit are held together by the fastener, the adhesive or both thereof.

7. The fire-retarding cable conduit of claim 6, wherein the fastener comprises a plurality of U-shaped retaining clamps, evenly spaced apart from each other and arranged along opposite longitudinal edges of the first slit and the second slit, wherein the plurality of U-shaped retaining claims are capable of being inserted into the body and are capable of being removed from the body, such that the electrical lines are insertable through the first slit and the second slit.

8. The fire-retarding cable conduit of claim 1, wherein the first slit comprises two curved surfaces approaching the interior volume approximately tangentially and having an arcuate shape.

9. The fire-retarding cable conduit of claim 1, wherein the first slit comprises two surfaces, each of the two surfaces having a substantially zigzag shape formed therein such that the first slit has an interlocking fit when the two surfaces are closed together.

10. The fire-retarding cable conduit of claim 1, wherein the body further comprises a starting section at one axial end of the body having a projection, and an end section at an opposite axial end of the body having an indentation shaped to mate with the projection without forming a substantial gap such that cable conduits of any desired length are capable of being formed by adjoining a plurality of the fire-retarding cable conduits one to the other.

11. The fire-retarding cable conduit of claim 10, wherein the projection is shaped as a truncated cone.

12. The fire-retarding cable conduit of claim 10, wherein the projection is shaped such that the width of the projection corresponds to about an exterior diameter of the tubular base body, and the indentation is a recessed piece, wherein the width of the recessed piece corresponds to about the exterior diameter, such that the starting section of a first conduit is capable of being adjoined with the end section of a second conduit in a line without forming a substantial gap between the projection of the starting section of the first conduit and the recess piece of the end section of the second conduit.

* * * * *